July 4, 1939.   C. A. BREWER   2,164,897
CONTROL MECHANISM FOR MOTOR VEHICLES
Filed March 16, 1935
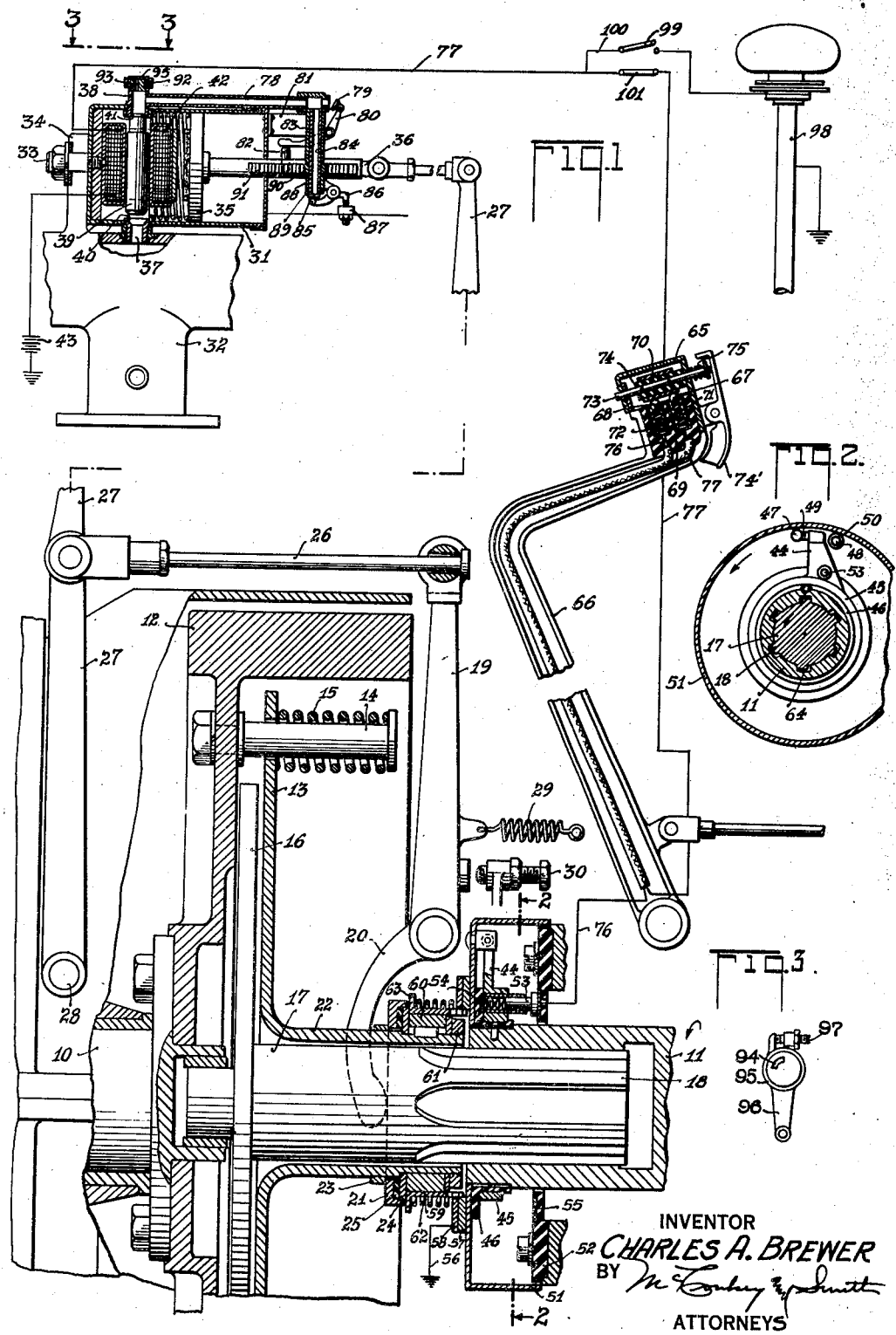
INVENTOR
CHARLES A. BREWER
BY
ATTORNEYS Patented July 4, 1939

2,164,897

UNITED STATES PATENT OFFICE 2,164,897

CONTROL MECHANISM FOR MOTOR VEHICLES

Charles A. Brewer, Noroton Heights, Conn., assignor of one-half to Philip J. Kury, Arverne, N. Y.

Application March 16, 1935, Serial No. 11,390

14 Claims. (Cl. 192—13)

This invention relates to control means for automotive vehicles, and more particularly to mechanism for controlling the operation of means for drivably connecting the driving and driven shafts of an automobile or other vehicle.

One of the objects of the present invention is to provide novel means for controlling the operation of automatically operable power means adapted to control the connection between the driving and driven shafts of an automotive vehicle whereby said power means may be rendered ineffective to disconnect said shafts when the vehicle brakes are applied.

Another object of this invention is to provide novel means whereby the driving and driven shafts of an automotive vehicle are disconnected whenever the driven shaft tends to overrun the driving shaft.

Still another object is to provide novel means whereby the clutch mechanism of an automotive vehicle will, under normal driving conditions, be permitted to move into engagement only when the driving and driven shafts are rotating at substantially equal speeds.

A further object is to provide novel means for controlling the engaging movement of the clutch mechanism of a motor vehicle.

A still further object is to provide novel means for controlling a clutch actuating power device, whereby the latter is rendered effective to automatically retard the engaging movement of the clutch mechanism at substantially the point of initial engagement irrespective of wear of said mechanism.

The above and further objects and novel features of this invention will more fully appear from the following detailed description taken in connection with the accompanying drawing. It is to be expressly understood, however, that the drawing is for the purpose of illustration only and is not designed as a definition of the limits of the invention, reference being primarily had for this purpose to the appended claims.

In the drawing, wherein like reference characters refer to like parts throughout the several views, Fig. 1 is a side elevation, partly in section and with parts broken away, illustrating one form of the present invention;

Fig. 2 is a sectional view, taken on line 2—2 of Fig. 1; and

Fig. 3 is a top plan, viewed from line 3—3 showing a detail of the control means for the power device illustrated in Fig. 1.

One embodiment of the present invention is illustrated, by way of example, in combination with the clutch and brake mechanisms of an automotive vehicle, and, as shown, comprises a friction disc clutch for drivably connecting the engine or driving shaft 10 to the driven or main drive shaft 11. The clutch mechanism comprises a flywheel 12 rigidly connected to driving shaft 10 and having a friction disc 13 mounted thereon by means of a plurality of pins 14 secured to said flywheel and extending through openings adjacent the periphery of said disc. Springs 15 are interposed between the outer surface of disc 13 and shoulders on the outer ends of pins 14 for normally urging said disc toward the inner face of flywheel 12. Extending radially between the inner face of flywheel 12 and driving disc 13 is a driven friction disc 16 rigidly secured to or formed integrally with a short stub shaft 17 which slidably extends through disc 13 and is journaled at the forward end thereof in the hub of flywheel 12 and drivably connected at its other end to driven shaft 11 for longitudinal and slight rotary movement relative thereto by any suitable means such as splines 18. Springs 15 thus normally function to hold disc 13 in contact with disc 16 and the latter in contact with flywheel 12, thereby establishing a frictional driving connection or clutch between shaft 10 and shaft 11.

The means provided for disengaging the clutch comprise a pivoted lever 19, the lower bifurcated end 20 of which is adapted to engage a collar 21 having a loose fit on a rearwardly extending hub portion 22 of disc 13, which hub portion may be considered as a part or an extension of driving shaft 10, the same being rigidly connected thereto for rotation therewith through disc 13, pins 14 and flywheel 12. Shifting collar 21 is held in position on hub 22 by a pair of retainer rings 23 and 24. Ring 24 is preferably spaced from member 22 by a non-friction washer 25, thereby permitting free relative movement between hub 22 and collar 21. The outer end of lever 19 is pivotally connected to a link 26 which is in turn pivotally secured to a lever 27 pivoted at 28 on the engine housing and connected at its other end to a movable member of a power device to be hereinafter described for actuating the clutch. A spring 29 is provided for normally holding lever 18 in retracted position against an adjustable stop 30 and for maintaining fork 20 out of engagement with collar 21 during normal operation to prevent unnecessary frictional wear.

Novel power means are provided for actuating the above described clutch, said means, as shown in the illustrated embodiment, comprising a cylinder 31 stationarily mounted on intake manifold 32 of the vehicle engine, the same being secured thereto by means of a bolt 33 rigidly attached to one end of said cylinder and adapted to cooperate with a slotted bracket member 34 cast integrally with said manifold. A piston 35 is provided in cylinder 31 for movement relative thereto, said piston being operatively connected by means of a piston rod 36 to lever 27. The left hand end of cylinder 31, as viewed in the drawing, may be connected either to intake manifold 32 or other suitable source of fluid pressure by means of a conduit 37 when it is desired to disengage the clutch, or to the atmosphere by means of a conduit 38 to permit the clutch to engage.

Novel means are provided for controlling the fluid pressure and atmosphere connections to cylinder 31 whereby the power device 31, 35 is rendered effective to disengage the clutch whenever driven shaft 11 tends to overrun driving shaft 10, such as, for example, when the engine accelerator (not shown) is released an appreciable amount, thereby causing the engine speed and hence that of the driving shaft to drop below that imparted to the driven shaft by the inertia of the moving vehicle. Such control means, as shown, comprise a double ended valve member 39, the beveled ends of which are adapted to selectively engage valve seats 40 and 41 at the inner ends of conduits 37 and 38, respectively. Valve member 39 normally engages valve seat 40, being held thereon either by gravity or a suitable spring (not shown) to thereby close the fluid pressure connection and open the atmospheric connection. Preferably, said valve member constitutes the movable core of a solenoid coil 42 of which latter, when energized, is effective to set up electro-magnetic forces adapted to move said valve member into engagement with valve seat 41, thus simultaneously opening the fluid pressure connection 37 and closing the atmospheric connection 38. When, therefore, in the illustrated embodiment, coil 42 is energized and valve member 39 moved to the position shown in the drawing, the left end of cylinder 31 will be evacuated and piston 35 will be moved to the left by atmospheric pressure acting on the opposite face thereof to thereby disengage the clutch by actuation of levers 27 and 19. One terminal of coil 42 is connected directly to a source of electric energy such as battery 43 while the other terminal thereof is connected to the other side of said battery through ground and novel switch means to be hereinafter described.

For the purpose of rendering the control means responsive to relative movement of shafts 10 and 11 and hence cause the power device to function to disengage the clutch when shaft 11 tends to overrun shaft 10, novel switch means are provided which, as shown, comprise a contact arm 44 (Fig. 2) formed integrally with a ring 45 which is mounted on shaft 11 for rotation therewith and insulated therefrom by an insulating ring 46 pinned to said shaft. The outer end of arm 44 extends radially between a pair of pins 47 and 48, one of which is provided with a contact 49, the other with an insulating roller 50, said pins being carried by a cup shaped housing 51 mounted concentrically with shaft 11 and adapted to float thereon. An insulating disc 52 having a slightly smaller diameter than housing 51 is stationarily mounted on the vehicle frame and extends into the open end of said housing.

In the illustrated embodiment, contact arm 44 is connected in circuit with solenoid 42 by a pin or brush 53 slidably mounted in a bushing in arm 44 for electrical contact therewith, a spring 54 being provided for yieldingly holding said brush in contact with a ring contact 55 embedded in disc 52. Contact 49, adapted to be engaged by a contact carried on arm 44 for closing the circuit, is grounded through housing 51 and the vehicle chassis, as indicated by lead 56 (Fig. 1).

Housing 51, although loosely mounted on shaft 11, is limited in its rotary movement relative thereto for opening and closing switch 44, 49 by the clearance between pins 47 and 48 and the outer end of arm 44. Means are provided whereby this limited relative movement is made to depend upon relative rotational movement of shafts 10 and 11 when the clutch is engaged, thus rendering the opening and closing of control switch 44, 49 responsive to relative movement of the driving and driven shafts. For this purpose, frictional means are interposed between housing 51 and hub 22, which latter is a section of the driving shaft, such means as shown comprising a pair of friction rings or washers 57 and 58, the former of which is mounted to float about hub 22, whereas the latter is mounted for rotation with, but movable longitudinally of, said hub. Preferably ring 58 is splined to a sleeve 59 having a driving fit on a second sleeve 60 keyed to hub 22 and held thereon by a suitable nut 61. A spring 62 is interposed between a flange 63 on the forward end of sleeve 59 and friction ring 58 to normally hold rings 57 and 58 in frictional engagement with each other and with housing 51. By virtue of this frictional connection between the driving shaft 10, 22 and housing 51, the latter tends to move relatively to driven shaft 11 in conjunction with shaft 10, 22, thus causing arm 44 to move into and out of engagement with contact 49 depending upon the direction of relative rotation between said driving and driven shafts.

In order to provide for relative movement between shafts 10 and 11 when the clutch is in engaged position, splines 18 on shaft 17 are a few thousandths smaller than the grooves 64 in shaft 11. The relative movement thus permitted when the prevailing driving torque is shifted from shaft 10 to shaft 11, as when the accelerator is released and the momentum of the vehicle is permitted to drive against the engine through shaft 11, or vice versa, as when the engine speed is again increased and shaft 10 picks up and begins to drive shaft 11, is effective to make and break a circuit including solenoid 42 at contacts 44, 49. When shaft 11 tends to drive shaft 10, as in the first example above, contact arm 44 and contact 49 will move into engagement, whereas when the drive is from shaft 10, arm 44 will engage roller 50. As will hereinafter appear, clutch 13, 16 will normally be disengaged by power device 31, 35 whenever solenoid 42 is energized by closure of switch 44, 49.

It is often desirable, as when descending a grade, to maintain the clutch in engaged position even though shaft 11 tends to overrun shaft 10 in order that the compression of the engine may be employed to assist in braking the vehicle. For this purpose novel switch means associated with the brake mechanism of the vehicle are provided in the circuit between switch 44, 49 and solenoid 42 whereby switch 44, 49 may be rendered ineffective to cause the power device 31, 35 to disengage the clutch when the brakes are applied. In the illustrated embodiment, such switch means are contained in a housing 65 which constitutes the pedal portion of foot brake lever 66. A pair of spring pressed ball contacts 67 and 68 are mounted in an insulating block 69 in said housing and are both normally pressed against a conducting sleeve 70 by springs 71 and 72 respectively. Sleeve 70 is carried by a slidably mounted pin 73 from which it is insulated by a sleeve 74. One end of pin 73 projects through the face of pedal 65 and is adapted to be engaged by a pivoted foot pad 74'. A spring 75 normally holds pin 73 in the position shown in the drawing whereby sleeve 70 forms an electrical connection between ball contacts 67 and 68. When the brakes are applied and the upper end of pad 74' is depressed, pin 73 is moved to the left, as seen in the drawing, and sleeve 70 is moved out of contact with ball 67, thereby breaking the circuit through the switch. Ball contact 67 is connected through spring 71 and lead 77 to solenoid 42 and ball 68 is connected by means of spring 72 and lead 76 to contact ring 55. If desired, the brakes may be operated by applying pressure to the lower portion of pad 74' without thereby opening the circuit at contact 67.

Novel means are also provided in combination with power device 31, 35, whereby the latter is rendered automatically effective to retard the engaging movement of the clutch, said means being responsive to the initial engagement of the clutch surfaces for this purpose, thereby eliminating any necessity for adjustment in order to obtain retardation of the clutch elements at substantially the point of initial engagement of the same. Said novel means, in the form illustrated, are constituted by a centrifugally controlled valve adapted, in combination with other valves, to control the atmospheric inlet to the left hand end of power cylinder 31 whereby the resistance offered by the power device to clutch engagement is varied.

As shown, atmosphere inlet conduit 38 is provided with a branch conduit 78, the outer end of which is adapted to be normally closed by a valve 79 pivotally mounted on an arm 80 which is in turn pivotally mounted on a bracket 81 secured to cylinder 31. The lower end of arm 80 is weighted to normally hold valve 79 in closed position and is adapted to be engaged by a pin or cam 82 carried by piston rod 36 whereby said valve is opened when the clutch is disengaged, i. e. when piston 35 is moved to the position illustrated. Cam or pin 82 is so adjusted with relation to arm 80 as to permit closure of valve 79 prior to engagement of the clutch driving elements 13, 16 when the latter are moving toward engaged position.

Conduit 78 is also provided with a branch conduit between valve 79 and conduit 38 which comprises a sleeve 83 having a tube 84 tightly fitted therein and extending beyond the outer end thereof. The passage of atmosphere through said tube and thence into cylinder 31 is controlled by a centrifugally actuated valve 85 pivotally mounted on an arm 86 provided at its outer end with an adjustable weight 87 adapted to normally hold said valve in closed position. Arm 86 is pivotally secured to a sleeve 88 rotatably mounted on tube 84 and retained thereon by a lock nut 89. A pinion 90, formed integrally with or rigidly secured on sleeve 88, meshes with a rack 91 mounted on and extending longitudinally of piston rod 36. When, therefore, piston 35 moves to the right to permit engagement of the clutch, sleeve 88 will be rotated, thus revolving weight 87. The latter is thereby caused by centrifugal forces acting thereon to move outwardly from its axis of revolution to open valve 85 and permit free entrance of air through conduits 84 and 78 to the evacuated end of cylinder 31. When the clutch plates reach initial engagement, the movement of piston 35 will, by reason of such engagement, be momentarily retarded and weight 87, upon cessation of the centrifugal force acting thereon, will move valve 85 to closed position. A light spring (not shown) may, if desired, be employed for normally holding valves 79 and 85 in closed position.

The remainder of the engaging movement of the clutch surfaces, i. e. after initial engagement thereof, is controlled by the entrance of air through an adjustable bleed valve on the outer end of conduit 38. Said bleed valve, as shown, comprises a plug 92 (Fig. 1) in said conduit having a small opening 93 therein adapted to cooperate with a tapered slot 94 (Fig. 3) in a cap 95 rotatably secured on said plug. An arm 96 is provided for moving cap 95 relative to plug 92 to adjust bleed 93, 94 to any desired degree of opening, from fully closed to fully open. An adjustable stop 97 is provided for limiting the movement of cap 95.

Switch means may also be provided for controlling the operation of the power device to cause the latter to disengage the clutch irrespective of the positions of switches 67, 70 and 44, 49. Preferably, such means are associated with the gear shift lever 98 in order to insure clutch disengagement when the gears are being shifted. Any suitable type of switch may be employed, a switch 99 being shown diagrammatically with one terminal connected to ground through lever 98 and the other connected to solenoid 42 through leads 100 and 77.

A manually actuated switch 101 is provided in lead 77 for the purpose of rendering control switch 44, 49 ineffective to control power device 31, 35 if it is desired to do so.

In the normal operation of a vehicle embodying this invention, drive shaft 10 transmits torque through clutch 13, 16 and stub shaft 17 to shaft 11 and thence to the wheels of the vehicle, said shafts rotating in the direction indicated by the arrows. With shaft 10 thus tending to overrun shaft 11, housing 51 being frictionally connected to the former will, in effect, lead arm 44 which is connected to shaft 11, thereby maintaining switch 44, 49 in open position, breaking the circuit to solenoid 42. If now, the engine accelerator pedal is released to such an extent and in such manner as to permit torque to be transmitted from shaft 11, because of the momentum of the vehicle, to shaft 10 which slows down upon release of said pedal, the former will tend to overrun shaft 10, thus rotating relatively thereto to the extent permitted by the clearance between splines 18 and the walls of grooves 64. This relative movement is amplified at the end of arm 44 which, as a result, moves into engagement with contact 49 since the latter with housing 51 is frictionally connected to shaft 10 through friction rings 57, 58 and hub 22, and accordingly moves relatively to shaft 11 together with shaft 10. The circuit to solenoid 42 is, under the above conditions, closed as long as switch 67, 70 is also closed.

Said solenoid being thus energized, valve 39 is attracted upwardly to the illustrated position, closing conduit 38 and opening conduit 37, thereby connecting cylinder 31 to intake manifold 32. The left end of cylinder 31 will thereupon be evacuated by the suction from intake manifold 32 and piston 35 will be moved to the left, thereby disengaging clutch 13, 16 through the actuation of levers 27 and 19. Switch 44, 49 will remain closed and the clutch disengaged as long as the speed of shaft 11 exceeds that of shaft 10. When the engine speed and hence that of shaft 10 is again increased, or when that of shaft 11 decreases under load and friction, the circuit to solenoid 42 will be broken at switch 44, 49 the instant that shaft 10 begins to overrun shaft 11. Valve 39 will then be moved downwardly to close conduit 37 and open conduit 38, thus permitting the entrance of atmosphere to cylinder 31, whereupon clutch surfaces 13, 16 will be moved toward engaged position under the influence of springs 15. Power device 31, 35 continues to function, however, to control the engaging movement of clutch 13, 16 in a manner that will hereinafter appear. It will thus be seen that under normal operating conditions the clutch moves into engagement only when the driving and driven shafts are rotating at substantially equal speeds, thereby eliminating the bump or jerk experienced in modern automobiles when the engine speed is increased after a comparatively sudden release of the accelerator.

If it is desired to employ the compression of the engine to assist in braking the vehicle when shaft 11 overruns shaft 10, the control means for power device 31, 35 may be rendered ineffective when the vehicle brakes are applied. When said brakes are applied through pedal 66, the upper end of pad 74 will be depressed, thereby opening the circuit to solenoid 42 at contacts 67, 70. The power device may therefore be rendered ineffective to disengage the clutch when the brakes are applied, irrespective of the position of switch 44, 49. If clutch 13, 16 is disengaged when the brakes are applied, breaking the circuit at 67, 70 will deenergize power device 31, 35 and permit said clutch to again engage. It will be noted that switch 67, 70 may be actuated independently of brake actuation.

Assuming the clutch to be disengaged, the parts being in the positions illustrated in the drawing, when solenoid 42 is deenergized in either of the above described manners and valve member 39 is moved to its lower position, cylinder 31 will be opened to free influx of air through conduit 78 since valve 79 is being held in open position by cam 82. The pressure differential acting upon piston 35 is thus decreased and clutch surfaces 13, 16 are moved rapidly toward engaged position by springs 15. The movement of piston 35 to the right, acting through rack 91 and pinion 90, rotates sleeve 88 and valve 85, causing weight 87 to be thrown outwardly to open said valve 85. Valve 79 is adjusted to close prior to the engagement of clutch 13, 16, but the opening of valve 85 by the centrifugal means described permits the continued free influx of air to cylinder 31 until the instant of actual clutch engagement. The clutch elements and movable parts of the power device are naturally retarded when the former initially engage and, as a result, the centrifugal force acting upon weight 87 ceases to be sufficient to retain valve 85 in open position.

Entrance of air to cylinder 31 after closure of both valves 79 and 85 is restricted to that permitted to enter through bleed valve 93, 94. Continued movement of piston 35 to the right and hence the remainder of the engaging movement of clutch elements 13, 16 is accordingly comparatively slow and even, thereby permitting smooth clutch engagement and preventing jerking of the vehicle by too sudden engagement of the clutch surfaces. If desired, suitable means may be provided for again opening cylinder 31 to free influx of air as soon as the driving engagement is fully established.

There is thus provided novel vehicle control apparatus whereby the vehicle clutch may be automatically disengaged whenever the speed of the vehicle tends to exceed that which the engine tends to impart to it and whereby said clutch is permitted to engage during normal operation of the vehicle only when the shafts which the same connects are rotating at substantially equal speeds, thus eliminating the usual drag or bump experienced when the accelerator is depressed after temporary release of the same. The novel control device provided permits the vehicle to free wheel whenever the accelerator is suddenly released, whether completely or only partially released, thereby conserving fuel, but at the same time includes means whereby the vehicle motor may be employed to assist in the braking effort in order to increase the maximum available braking power and to conserve the braking surfaces. In addition, novel means are provided for controlling the engaging movement of the clutch surfaces whereby said movement is slow and even after initial engagement of said surfaces, said means being responsive to said initial engagement thereby avoiding the necessity for adjustment because of clutch wear and the consequent change in the position of piston 35 relative to cylinder 31 when the clutch elements engage.

Although only one embodiment of the invention has been illustrated and described, it is to be expressly understood that various changes may be made without departing from the spirit and scope of the invention. For example, power device 31, 35 may comprise a stationary piston and movable cylinder and a power device of the diaphragm type may be employed, if desired. Numerous other changes may also be made in the design and arrangement of parts illustrated, as will now be obvious to those skilled in the art. Reference will be had primarily to the appended claims for a definition of the limits of the invention.

What is claimed is:

1. In an automotive vehicle, a drive shaft, a driven shaft, a clutch for drivably connecting said shafts, a power device connected to said clutch capable of releasing the same, a control device including valve means for the power device to cause the latter to function to release the clutch, and electric switch means responsive to relative movement of said shafts for controlling the operation of said valve means.

2. In an automotive vehicle, a drive shaft, a driven shaft, a clutch for drivably connecting said shafts, a power device connected to the clutch and capable of releasing the same, valve means controlling the operation of said power device, and electric switch means responsive to the relative movement of said shafts for actuating said valve means.

3. In an automotive vehicle, a drive shaft, a driven shaft, a clutch for drivably connecting said shafts, a power device connected to said clutch and adapted to disengage the same, means responsive to the relative rotation of said shafts to cause said device to function to disengage said clutch, and means associated with said power device and responsive to movement of the clutch for varying the resistance to the engaging movement of the clutch.

4. In an automotive vehicle, a drive shaft, a driven shaft, a clutch for drivably connecting said shafts, a power device connected to said clutch for disengaging the same, control means for said power device to render the same effective to disengage said clutch, said control means being responsive to the relative rotation of said shafts, and automatic means responsive to the movement of said clutch to vary the speed of engagement thereof.

5. In an automotive vehicle, a driving member, a driven member, a clutch adapted to drivably connect said members, a power device for disengaging said clutch, and control means for said power device responsive to relative movement of said members to cause said device to function to disengage the clutch, said power device comprising means responsive to movement of an element of said power device for varying the resistance to the engaging movement of the clutch.

6. In an automotive vehicle, a driving member, a driven member, a clutch adapted to drivably connect said members, a power device connected to said clutch and adapted to disengage the same, means for connecting the power device to a source of power, and electric switch means responsive to relative movement of said members for controlling said connecting means.

7. In an automotive vehicle, a driving member, a driven member, a clutch adapted to drivably connect said members, a power device connected to said clutch and adapted to disengage the same, means for connecting the power device to a source of power, and means responsive to relative movement of said members for controlling said connecting means, said power device comprising means responsive to movement of an element of said power device for varying the resistance to the engaging movement of the clutch.

8. In an automotive vehicle, a driving member, a driven member, a clutch adapted to drivably connect said members, a power device connected to said clutch and adapted to disengage the same, means for connecting the power device to a source of power, means responsive to relative movement of said members for controlling said connection, and means responsive to the initial engagement of the clutch for controlling the power device to retard the engaging movement of said clutch.

9. In an automotive vehicle, a driving member, a driven member, a clutch adapted to drivably connect said members, a power device connected to said clutch and adapted to disengage the same, means for connecting the power device to a source of power, means responsive to relative movement of said members for controlling said connection, and means operative when the driving surfaces of said clutch engage to render said power device effective to vary the resistance to the engaging movement of the clutch.

10. In an automotive vehicle, a drive member, a driven member, a clutch adapted to drivably connect said members, a power device connected to the clutch and capable of releasing the same, means connecting said device to a source of power, and centrifugal means associated with said power device for controlling the latter to vary the resistance to the engaging movement of the clutch.

11. The combination in an automotive vehicle having brake mechanism of a drive shaft, a driven shaft, clutch mechanism for drivably connecting said shafts, a power device connected to said clutch mechanism and adapted to disengage the same, control means for said power means responsive to relative movement of said shafts, and electric switch means associated with said brake mechanism to render said control means ineffective when the brakes are being applied.

12. The combination in an automotive vehicle having brake mechanism of a driving member, a driven member, a clutch for drivably connecting said members, a power device connected to the clutch and adapted to disengage the same, means for connecting the power device to a source of power, control means including a solenoid actuated valve for said connecting means, and electric switch means associated with said brake mechanism for rendering said control means ineffective to cause the power device to function to disengage the clutch when the brakes are applied.

13. In an automotive vehicle, a drive member, a driven member, a clutch adapted to drivably connect said members, a power device connected to the clutch and capable of releasing the same, means connecting said device to a source of power, and centrifugal means responsive to the initial engaging movement of the clutch elements for controlling the power device to vary the resistance to the engaging movement of the clutch.

14. The combination in an automotive vehicle having a brake mechanism of a drive shaft, a driven shaft, clutch mechanism for drivably connecting said shafts, a power device connected to said clutch mechanism and adapted to disengage the same, control means for said power device responsive to relative movement of said shafts, and means associated with said brake mechanism to render said control means ineffective when the brakes are being applied.

CHARLES A. BREWER.